United States Patent
Kawamata

Patent Number: 6,122,290
Date of Patent: Sep. 19, 2000

[54] MULTIMEDIA CONVERSION APPARATUS AND CONVERSION SYSTEM

[75] Inventor: Jiro Kawamata, Tokyo, Japan

[73] Assignee: NEC Corporation, Tokyo, Japan

[21] Appl. No.: 09/024,110

[22] Filed: Feb. 17, 1998

[30] Foreign Application Priority Data

Feb. 14, 1997 [JP] Japan ................................. 9-030398

[51] Int. Cl.[7] .................................................. H04J 3/22
[52] U.S. Cl. ................... 370/466; 379/88.13; 379/88.14
[58] Field of Search ................................ 370/465, 466, 370/469; 379/88.13, 88.14

[56] References Cited

U.S. PATENT DOCUMENTS

| | | | |
|---|---|---|---|
| 5,146,488 | 9/1992 | Okada et al. | 379/88 |
| 5,276,731 | 1/1994 | Arbel et al. | 379/88 |
| 5,289,523 | 2/1994 | Vasile et al. | 379/52 |
| 5,479,411 | 12/1995 | Klein | 379/88 |
| 5,524,137 | 6/1996 | Rhee | 379/67 |
| 5,661,783 | 8/1997 | Assis | 379/67 |
| 5,712,901 | 1/1998 | Meermans | 379/88 |
| 5,737,395 | 4/1998 | Irribarren | 379/88.13 |
| 5,802,150 | 9/1998 | Beck et al. | 379/93.06 |
| 5,953,392 | 9/1999 | Rhie et al. | 379/88.13 |

FOREIGN PATENT DOCUMENTS

4-302561  10/1992  Japan.

*Primary Examiner*—Hassan Kizou
*Assistant Examiner*—Saba Tsegaye
*Attorney, Agent, or Firm*—Sughrue, Mion, Zinn, Macpeak & Seas, PLLC

[57] ABSTRACT

A multimedia conversion apparatus creating a media conversion result with a quality expected by a user is offered. Data received by a receiving section is subjected to a media conversion according to different algorithms provided in the signal processing sections, and a judgement section derives a suitable conversion result giving priority to a precision among a plurality of media conversion results obtained by the signal processing sections. A transmission section selects a conversion result with a proper quality among the plurality of media conversion results, and transmits it to a receiving terminal. When a plurality of request for data conversions are competed among users data from other users than one exclusively using the multimedia conversion apparatus are temporarily stored in a buffer or are transferred to other multimedia conversion apparatus.

9 Claims, 7 Drawing Sheets

| REFERENCE DATA | VECTOR DISTANCE | |
| --- | --- | --- |
| | ALGORITHM A | ALGORITHM B |
| South Carolina | 2 (SMALLEST) | 5 |
| North Carolina | 3 | 3 (SMALLEST) |
| West Virginia | 10 | 9 |
| Indiana | 12 | 13 |
| Louisiana | 15 | 12 |
| RECOGNITION RESULT | South Carolina | North Carolina |

FIG. 5B

| REFERENCE DATA | ALGORITHM A × ALGORITHM B |
| --- | --- |
| South Carolina | 2×5=10 |
| North Carolina | 3×3=9 |
| West Virginia | 10×9=90 |
| Indiana | 12×13=156 |
| Louisiana | 15×12=180 |
| RECOGNITION RESULT | North Carolina |

FIG. 7

MULTIMEDIA CONVERSION APPARATUS AND CONVERSION SYSTEM

BACKGROUND OF THE INVENTION

The present invention relates to a media conversion apparatus for converting information formats into different media in a multimedia communication which integrates various kinds of information media such as voices, texts, images and so on.

In order to perform communication between different kinds of media in the multimedia communication, media conversions for converting the information formats or the like are necessary.

As for such kind of the media conversion apparatus, Japanese Patent Application Laid Open No. 4-302561 discloses a multimedia conversion system. The multimedia conversion system is provided with a signal processing unit for performing media conversions between different media, for example, between a voice and a text; and exchanging means for controlling the signal processing unit so as to convert into a signal coping with media of a destination terminal and sending the converted signal to the destination terminal, in a communication system connecting various kinds of media of a voice terminal, a text terminal and an image communication terminal.

A conventional media conversion apparatus has the signal processing unit which performs the media conversion for allowing inter communication between different media.

However, the conventional media conversion apparatus involves the following problems because the media conversion is performed regardless of quality of the media conversion, specifically, a processing time for the media conversion and an precision thereof.

The first problem is that results of the media conversion are not necessarily achieved within a processing time and with an accuracy, which are expected by users. This is because, in the conventional media conversion apparatus, requests of the users for the processing time of the media conversion and the precision thereof differ depending on communication contents and communication information, despite that the processing time and the precision of the signal processing unit serving as media conversion means are fixedly determined. For the media conversion apparatus which gives priority to the processing time, the precision is degraded, and for the media conversion apparatus which gives priority to the precision, the processing time is increased. The user could not determine the trade off between the processing time and the precision, conventionally.

The second problem is that the precision of the result of the media conversion is degraded depending on data processed by the media conversion apparatus because the features of specific algorithm performing the media conversion are reflected. For example, even if high precision algorithm were used in ideal circumferences, good tolerance to noises are not sometimes obtained. In such case, it will be sometimes difficult to perform the media conversion with a sufficiently high quality, when executing the multimedia communication.

Moreover, the third problem is that in the apparatus which particularly gives priority to the processing time to perform the media conversion on real time, no data is received from other users because the media conversion apparatus is occupied by one media conversion processing. Therefore, the conventional media conversion apparatus could not be used by a plurality of users.

The object of the present invention is to provide a multimedia conversion apparatus which is capable of performing a media conversion with a quality expected by users and particularly expected by receiving side users.

Another object of the present invention is to provide a multimedia conversion apparatus which is capable of performing a media conversion without being affected by characteristics of a specified algorithm of the media conversion, when dealing with various kinds of input data.

Still further object of the present invention is to provide a multimedia conversion apparatus which is capable of being used by a plurality of users.

SUMMARY OF THE INVENTION

In order to achieve the foregoing objects, there is provided a multimedia conversion apparatus of the present invention which performs a media conversion when communicating among different kinds of media, wherein provided are a plurality of signal processing sections for performing media conversions for various kinds of data to convert other information formats in a different quality according to different algorithm respectively, and a plurality of media conversion results by the plurality of signal processing sections are partially selected, thereby transmitting the selected results to a receiving side user.

Here, the media conversions performed in the signal processing sections shall include all of the media conversions required in the multimedia communications, specifically, the media conversions shall include a voice recognition processing for converting a voice signal to a text data, a voice synthesizing processing for converting the text data to a voice data, a character recognition processing for converting an information format from an image data to a text data and the like.

Moreover, a quality of the media conversion result shall be evaluated depending on the processing time of the media conversion and the precision thereof. Here, the precision shall mean to what degree contents of the received data are precisely included.

Each of the signal processing sections of the present invention outputs the media conversion result when the processing time is given priority to the precision and the media conversion result when the precision is given priority to the conversion time, according to the respective algorithm. Therefore, the multimedia conversion apparatus according to the present invention derives a plurality of results such as the results obtained by giving priority to the processing time and those obtained by giving priority to the precision, and select the media conversion results desired by user, particularly by the receiving side user to offer the selected results to the user. Thus, the multimedia conversion apparatus can offer the media conversion result to the users those who give priority to the processing time in a short time, and can offer the more precise media conversion results to the users those who give priority to the precision.

The signal processing sections may be designed such that data is directly input thereto from a receiving section. However, as a matter of course, a buffer for temporarily storing this data may be provided to read the data from the buffer. Particularly, since a signal processing section possessing an algorithm preferring the precision to the processing time sometimes performs at different processing speeds for the media conversions, the data should be input thereto via the buffer.

In the multimedia conversion apparatus according to the present invention, a plurality of media conversion results obtained according to the different algorithms are transmitted to the receiving users, and the media conversion apparatus receives instructions concerning media conversion quality from the receiving users in its transmission section and transmits the media conversion results of appropriate quality to the receiving users, according to the instructions.

As described above, the transmission section has a communication function with users, whereby the users give the instructions as quality requested by them to the transmission section and the media conversion results with the desired quality can be more smoothly offered to the users.

Moreover, the multimedia conversion apparatus is characterized in that it can select the media conversion results giving priority to the processing time among the plurality of media conversion results and transmits them.

Moreover, the multimedia conversion apparatus is characterized in that it can also select the media conversion results giving priority to the precision among the plurality of media conversion results and transmits them.

Still furthermore, when the transmission section receives the instructions from the users, the media conversion results either giving priority to the processing time or giving priority to the precision according to the demands of the users are selected.

In the multimedia conversion apparatus according to the present invention, when the media conversion results giving priority to the precision are transmitted, the transmission section may simply select the conversion results obtained by algorithm giving priority to the precision among the plurality of media conversion results. The multimedia conversion apparatus comprises a judgement section which makes an overall judgement from the plurality of media conversion results described above to derive media conversion results with a higher precision.

By making the overall judgement from the results derived from the plurality of different algorithms, influences of the properties of the specified algorithms are removed so that the media conversion results not dominated by the algorithm for any data can be provided.

Moreover, in the multimedia conversion apparatus of the present invention, each of the plurality of signal processing sections comprises a processing time priority signal processing section which performs a media conversion into a different information format for data received by the receiving section, and a plurality of precision priority signal processing sections which perform media conversions of data into the different information format according to different algorithms giving priority to the precision, wherein the judgement section derives a high precision media conversion result based on a plurality of media conversion results obtained by the precision priority signal processing sections, a transmission section thereof first transmits a media conversion result obtained by the processing time priority signal processing section to the users and retransmits a high precision media conversion result derived by the judgement section based on the instruction indicating a precision priority from users.

In the present invention, first, the user receives the media conversion result giving priority to the processing time. When the media conversion result giving priority to the processing time does not give a enough quality, that is, the precision, to satisfy the user, the user gives to the multimedia conversion apparatus the instruction to request the media conversion result giving priority to the precision. The multimedia conversion apparatus receives this instruction in its transmission section, whereby the transmission section transmits to the user the media conversion result giving priority to the precision derived by the judgement section.

In the multimedia conversion apparatus, the judgement section refers the data received by the receiving section and selects among the plurality of media conversion results the media conversion result of the signal processing section having a algorithm suitable for the received data.

Specifically, the present invention considers the relation between properties and states of the received data and algorithm of the media conversion, when selecting the media conversion result, whereby the media conversion result which is media-converted by a suitable algorithm is selected. Thus, by considering noises superimposed on the received data, the media conversion having a good tolerance to the noises can be performed.

The multimedia conversion apparatus of the present invention comprises a buffer for temporarily storing the data received by the receiving section, wherein the plurality of signal processing sections described above perform the media conversion for the data stored in the buffer to convert it into other information formats. The receiving section accommodates a plurality of users, and while this multimedia conversion apparatus is being used by one user, data received from other users is temporarily stored in the buffer, and, after completion of the use of the multimedia conversion apparatus by the one user, the data from other users which has been stored in the buffer is subjected to the multimedia conversion.

Thus, one multimedia conversion apparatus can be used by a plurality of users, and other users than one user exclusively using the multimedia conversion apparatus are not required to send the data again.

A multimedia conversion system according to the present invention is composed of the plurality of multimedia conversion apparatus described above. Specifically, the plurality of multimedia conversion apparatus are connected to a network accommodating a plurality of users, and when one of the multimedia conversion apparatus is used by one user and data from other users (transmitting side) is received by the receiving section thereof, the receiving section thereof transfers that data to other multimedia conversion apparatus.

Thus, even if one multimedia conversion apparatus is exclusively used, the data from the user is automatically transferred to one of multimedia conversion apparatuses in other channels, whereby the data is received by one of the multimedia conversion apparatuses in other channels and the media conversion can be performed. Therefore, the user is not required to send the data again.

BRIEF DESCRIPTION OF THE DRAWINGS

For a more complete understanding of the present invention and the advantages thereof, reference is now made to the following description taken along in conjunction with the accompanying drawings.

DESCRIPTION OF THE PREFERRED EMBODIMENTS

Embodiment of the present invention will be described below with reference to the accompanying drawings.

Figure 1:
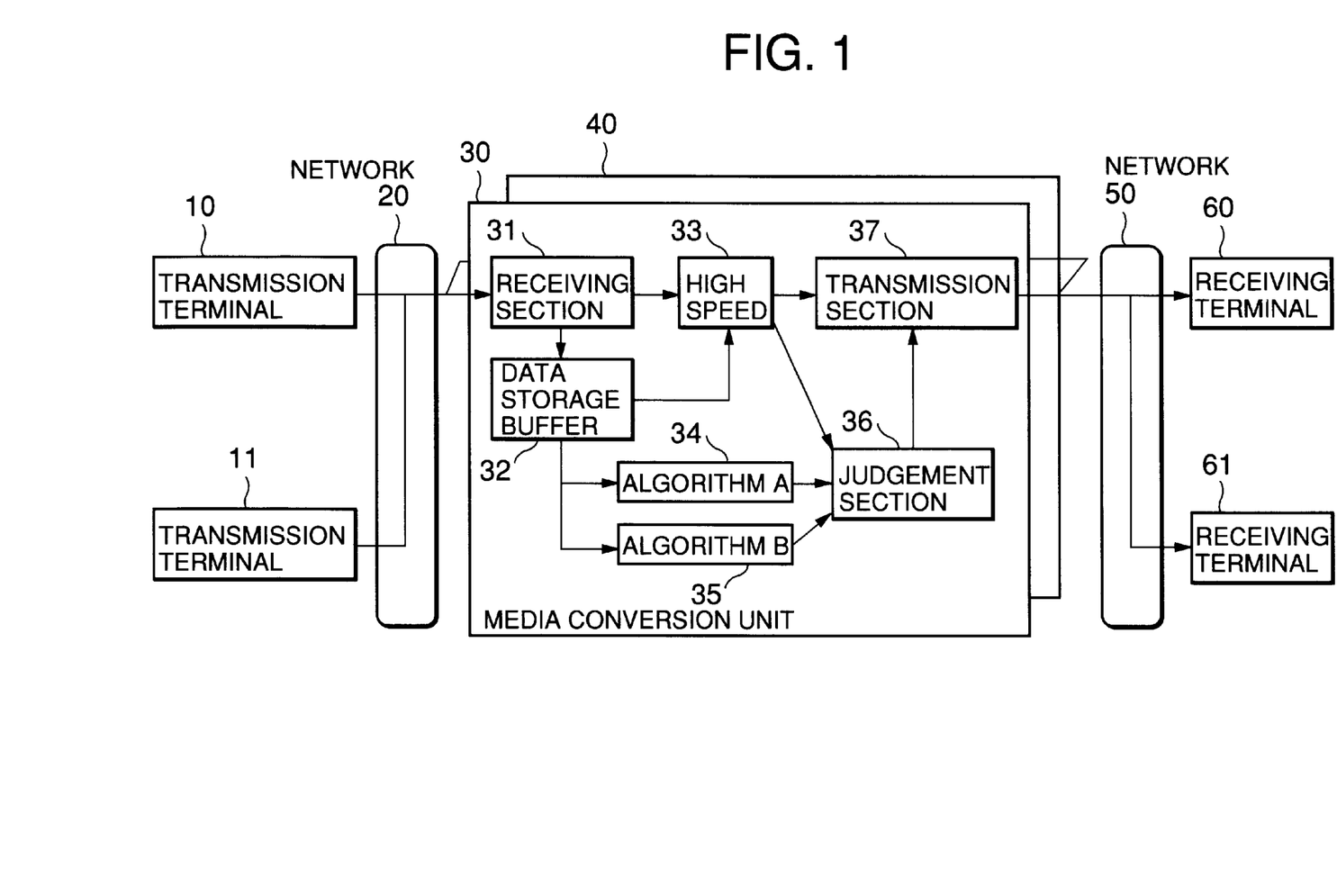
FIG. 1 is a drawing for explaining a structure of a multimedia conversion apparatus of a first embodiment according to the present invention.
Figure 2:
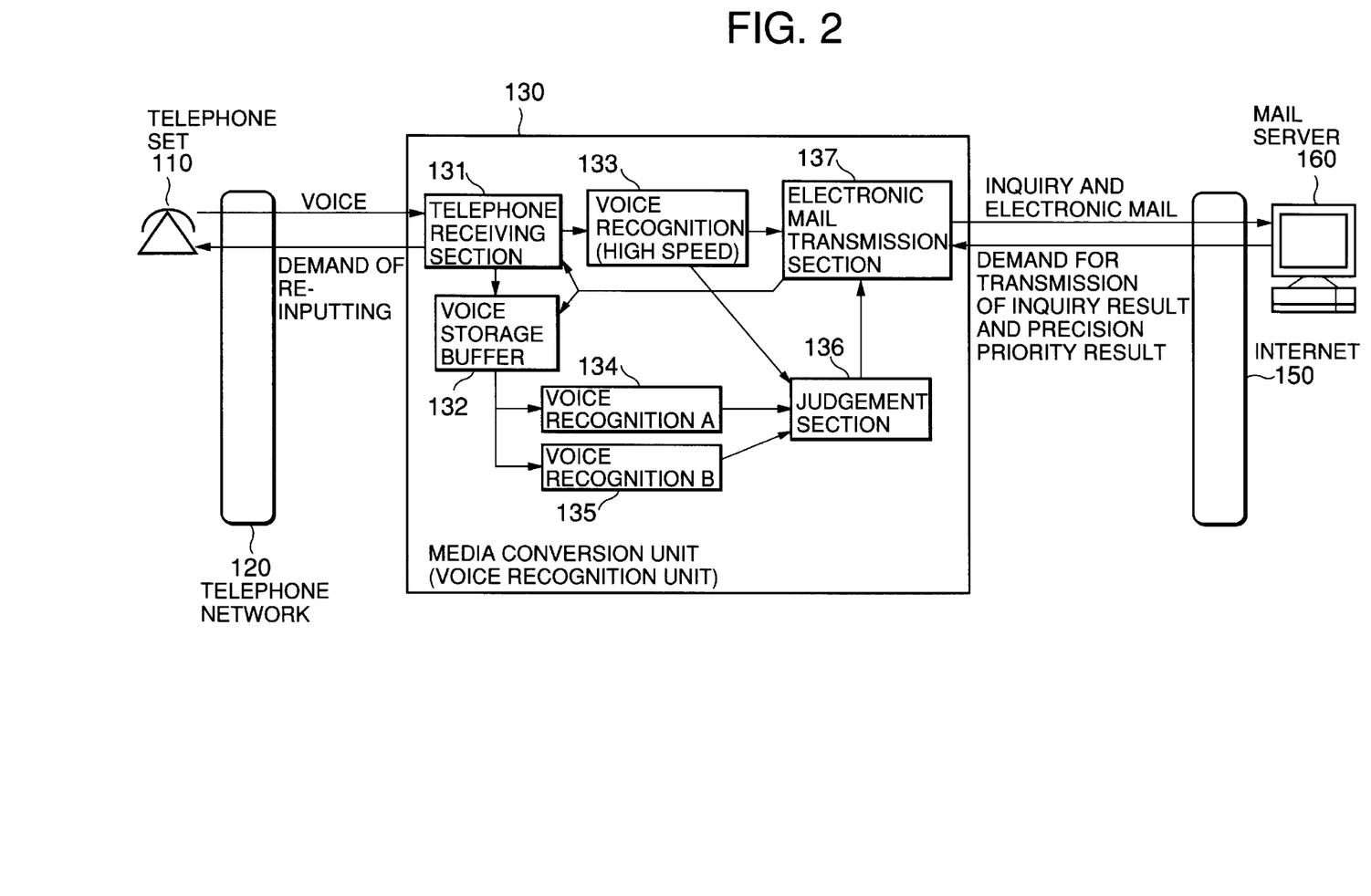
FIG. 2 is a drawing for explaining a structure of a voice conversion apparatus according to a second embodiment.

FIG. 1 shows a first embodiment of the present invention. FIG. 2 shows two multimedia conversion apparatuses 30 and 40 connected to networks 20 and 50, and these two multimedia conversion apparatuses 30 and 40 construct a multimedia conversion system.

Here, the multimedia conversion apparatus 30 comprises a receiving section 31 for receiving input data via a network 20; data storage buffer 32 for temporarily storing the data; three signal processing sections 33, 34 and 35 for performing media conversions according to different algorithms; a judgement section 36 for deriving multimedia conversion results giving priority to a precision based on media conversion results in the signal processing sections 33, 34 and 35; and a transmission section 37 for transmitting either the media conversion result of the signal processing section 33 or the media conversion result derived by the judgement section 36 to the network 50.

The other multimedia conversion apparatus 40 has the same structure as that of the multimedia conversion apparatus 30. An operation of the multimedia conversion apparatus 30 will be described as an example.

Referring to FIG. 1, the receiving section 31 of the multimedia conversion apparatus 30 receives input data via the network 20, the data being transmitted from a transmission terminal 10. The input data received by the receiving section 31 is sent to the data storage buffer 32 as well as to the signal processing section 33.

The signal processing section 33 performs a media conversion according to a high speed algorithm. Thereafter, signal processing section 33 sends the conversion result to the transmission section 37. It should be noted that the high speed algorithm is a media conversion algorithm preferring a processing time to a precision. It is assumed that image data on real time is converted into a different data format by the signal processing section 33.

The transmission section 37 transmits the media conversion result from the signal processing section 33 to the network 50 in order to address it to a receiving terminal 60 via the network 50.

On the other hand, the input data stored in the data storage buffer 32 is read out by the signal processing sections 34 and 35 respectively. The signal processing sections 34 and 35 perform media conversions for the input data according to different media conversion algorithms such as algorithms A and B, respectively, so as to convert it to other data formats.

Media conversion results obtained by the respective signal processing sections 33, 34 and 35 are transferred to the judgement section 36. The judgement section 36 derives a media conversion result giving priority to a precision by summarizing the media conversion results according to three kinds of algorithms. On deriving the media conversion result giving priority to the precision, considering that, for example, the signal processing sections 33, 34 and 35 perform a character recognition processing to convert character image data to text data, a plurality of text data obtained according to different algorithms are compared and inscriptions on a table obtained by writing portions of the different results in parallel are derived as the media conversion results.

The media conversion result giving priority to the precision derived in the above described manner is sent to the transmission section 37, and the transmission section 37 sends this media conversion result giving priority to the precision to the receiving terminal 60 via the network 50, after sending the media conversion result giving priority to the processing time.

Thus, the receiving terminal can obtain the media conversion result according to the high speed algorithm on real time and, at the same time, the receiving terminal can obtain the media conversion result giving priority to the precision. As a result, the receiving terminal can select a media conversion having a quality of a level approximately equal to the desired quality.

In the first embodiment, described was the example that both of the conversion results, one giving priority to the processing time and the other giving priority to the precision, are offered to the receiving terminal. The transmission section 37 may transmit a media conversion result at each of modes "for transmitting only a media conversion result giving priority to the processing time", "for transmitting only a media conversion result giving priority to the precision", and "for transmitting a media conversion result giving priority to the precision when a request is made by the user who received a media conversion result giving priority to the processing time".

Moreover, in the embodiment of the present invention, described was an example that when the result giving priority to the precision was derived, the high speed algorithm and the two algorithms A and B were used. The number of the algorithms is not limited to this. Therefore, the number of the signal processing sections included in the multimedia conversion apparatus is not limited particularly to three.

An operation of the multimedia conversion apparatus 30 accommodating a plurality of users is as follows.

As an example of this, considered is a case where a media conversion communication between a transmission terminal 11 and a receiving terminal 61 is performed when the signal processing section 33 having the high speed algorithm is used between the transmission terminal 10 and the receiving terminal 60. In such case, data from the transmission terminal 11 is temporarily stored in the data storage buffer 32. Then, when a processing between the transmission terminal 10 and the receiving terminal 60 by a high speed algorithm is completed, the data from the transmission terminal 11 stored in the data storage buffer 32 is read out by the signal processing section 33. A media conversion processing between the transmission terminal 11 and the receiving terminal 61 starts.

Moreover, an operation in a case where a plurality of users are accommodated in the two channel multimedia conversion system composed of the two multimedia conversion apparatuses 30 and 40 as is shown in FIG. 1 is as follows.

Similarly, at a situation that, when the signal processing section 33 is used between the transmission terminal 10 and the receiving terminal 60, a media conversion communication is performed between the transmission terminal 11 and the receiving terminal 61, data from the transmission terminal 11 is transmitted from the receiving section 30 to the different media conversion apparatus 40 which is not performing a processing. The transferred data is subjected to a media conversion processing in the multimedia conversion apparatus 40.

In the above description, described was the example that the one-to-one communication between the transmission terminal 10 and the receiving terminal 60 competed with the one-to-one communication between the transmission terminal 11 and the receiving terminal 61. In the present invention, there is no limitations to the number of the transmission terminals and the receiving terminals. Moreover, not only the one-to-one communication but also the one-to-n communication, the n-to-one communication and the n-to-n communication will be adopted.

Furthermore, as for the number of the channels of the media conversion system, the example of the two channels was described. However, as a matter of course, the number of the channels is not limited to this.

Figure 3:
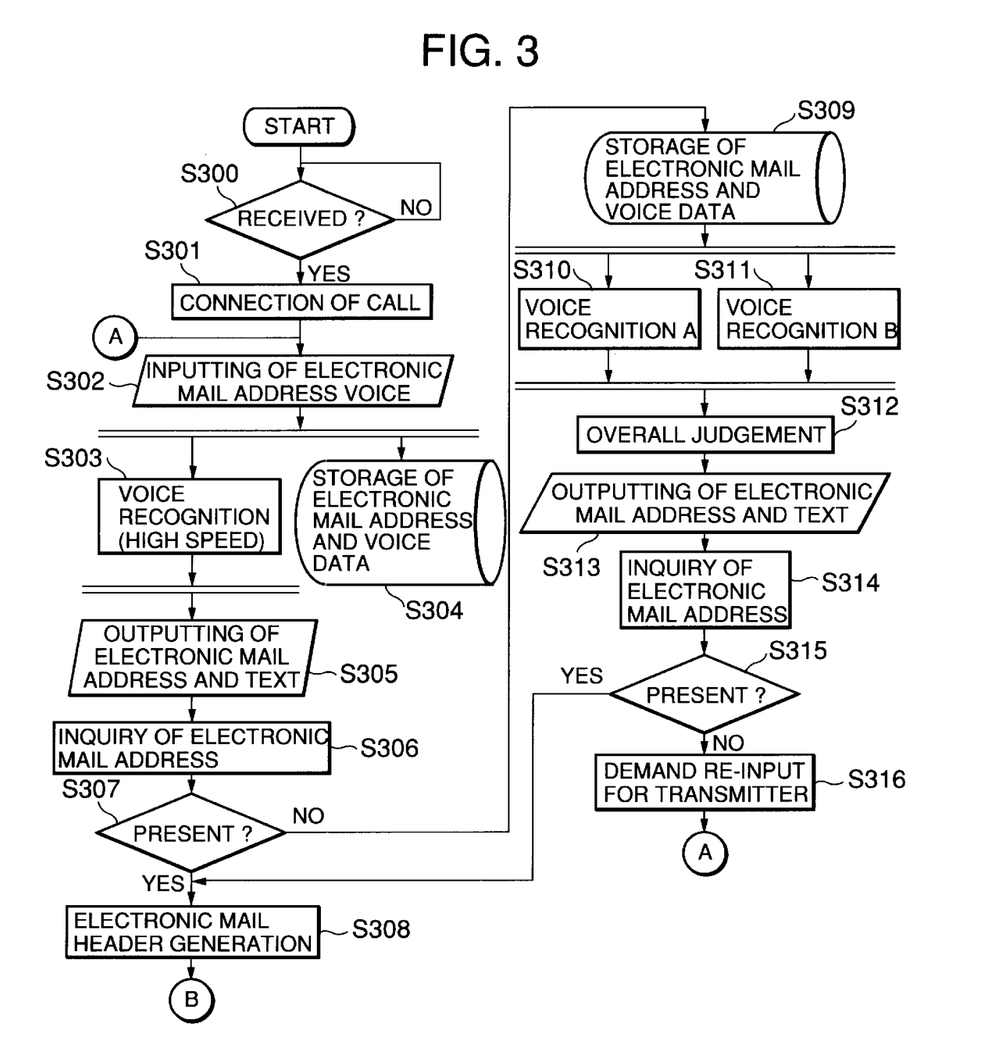
FIG. 3 is a flow chart for explaining an operation of the voice conversion apparatus according to the second embodiment.

Next, a second embodiment of the present invention will be described with reference to FIGS. 2, 3 and 4.

The second embodiment concerns the case where the present invention is applied to the voice recognition apparatus, and, in other words, the second embodiment concerns the multimedia conversion apparatus to offer the service to convert a voice mail to an electronic mail.

A construction of the multimedia conversion apparatus of the second embodiment is shown in FIG. 2.

A telephone receiving section 131 of a multimedia conversion apparatus 130 receives a voice signal from a telephone set 110 via a telephone network 120. A voice storage buffer 132 temporarily stores the received voice signal.

The multimedia conversion apparatus 130 comprises three signal processing sections 133, 134 and 135. The voice recognition section 133 among them possesses a voice recognition algorithm (high speed algorithm) giving priority to a processing time and performs a media conversion for the voice signal received by the telephone receiving section 131 so as to convert it into text data on real time, thereby outputting a media conversion result to a judgement section 136 and an electronic mail transmission section 137. The electronic mail transmission section 137 transmits the media conversion result giving priority to the processing time, obtained in the voice recognition section 133, to a mail server 160 via an internet 150.

On the other hand, other two voice recognition sections 134 and 135 output text data, processed by different voice recognition algorithms A and B giving priority to the precision, to the judgement section 136

An operation of such media conversion apparatus will be described with reference to the flow charts shown in FIGS. 3 and 4.

An information sender performs a call origination using the telephone set 110 via the telephone network 120 (Step 300). The telephone receiving section 131 receives the call of the information sender, whereby the information sender is connected to the media conversion apparatus 130 (Step 301).

When the information sender inputs an electronic mail address of a destination via the telephone network 120 in the form of a voice (Step 302), its voice data is sent to the voice recognition section 133 from the telephone receiving section 131 and, at the same time, the voice data is sent to the voice storage buffer 132 to be stored therein (Step 304).

The voice recognition section 133 recognizes the electronic mail address input as the voice data thereinto, whereby the voice recognition section 133 converts the voice data into text data (Step 303). The electronic mail address obtained as the conversion result is sent to the electronic mail transmission section 137 (Step 305).

The electronic mail transmission section 137 inquires the mail server 160 via the internet 150 for whether an electronic mail address obtained from the voice recognition result is present (Step 306). When the mail address is present, a header of the electronic mail is formed (Step 308). When the mail address is not present, it is assumed that a recognition error has occurred, and the procedure proceeds to a step 309 so that a voice recognition is again performed according to a method giving priority to a precision.

The method of the voice recognition giving priority to the precision is as follows.

The voice data of the electronic mail address store d in the voice storage buffer is read out to the voice recognition sections 134 and 135 (Step 309), and a voice recognition is performed according to a plurality of different algorithms that are voice recognition algorithms A and B (Step 310 and Step 311). Text data obtained as the result of the voice recognition is sent to the judgement section 136. One electronic mail address is derived by collectively judging the voice recognition results obtained by the two different algorithms (Step 312).

When the overall judgement is made from the two voice recognition results in the step 312, the judgement section 136 makes comparisons for the text data obtained form the voice recognition section 134 and 135 by each word. As a result, when the same media conversion results are obtained from the two voice recognition sections 134 and 135, the text data becomes a voice recognition result giving priority to the precision. Moreover, when the voice recognition results are not the same, a vector distance between a voice feature parameter of the voice data received via the telephone network 120 and a voice feature parameter of reference data previously prepared is computed. A media conversion result with a higher precision is derived based on this vector distance.

Figure 5A:
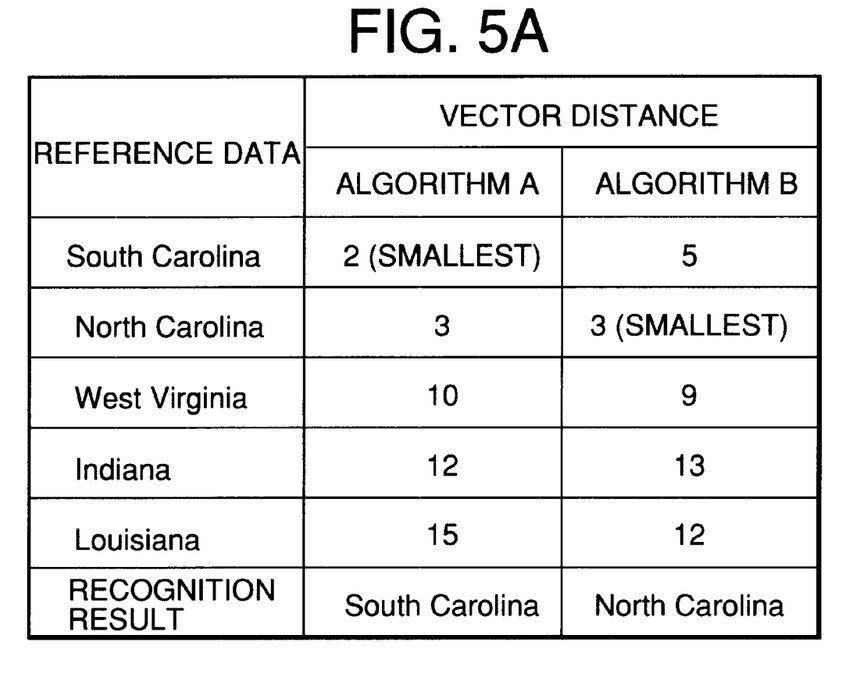
FIGS. 5(A) and 5(B) are drawings for explaining a method to derive a media conversion result giving priority to a precision.
Figure 5B:
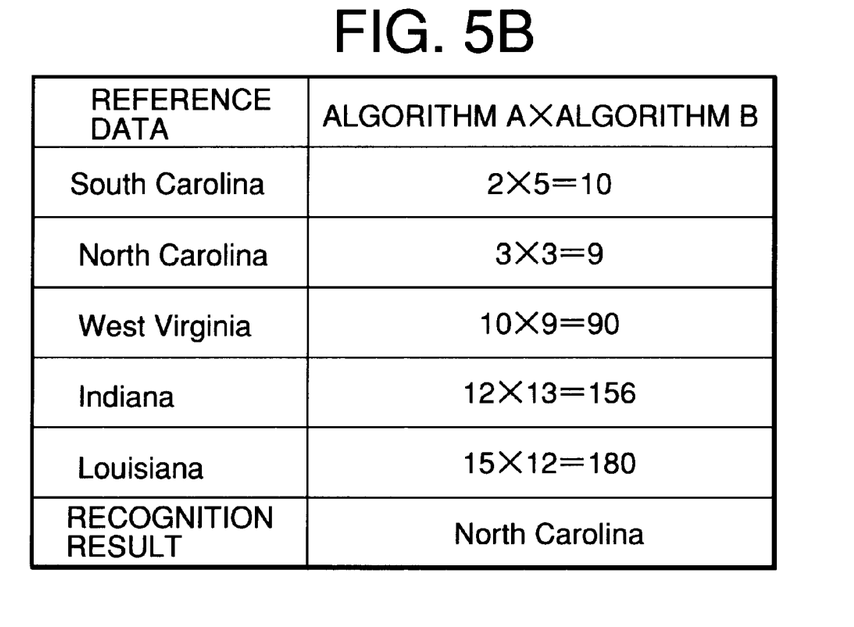

Here, procedures for deriving the media conversion result giving priority to the precision based on the vector distance will be described with reference to FIG. 5 below.

In general, a voice recognition algorithm computes a voice feature parameter of an input voice at the time when the voice data is received, and the voice feature parameter is compared with a voice feature parameter of reference data of either words or a phoneme stored previously in a memory, thereby computing a vector distance with respect to the voice feature parameter between the received voice data and the reference data. FIG. 5(a) shows examples of vector distance, five reference data and corresponding vector distance derived by the voice recognition algorithms A and B, respectively.

It can be considered that the vector distance in this voice recognition feature parameter space indicates a similarity between two data. Each algorithm outputs reference data of smallest vector distance, specifically, as a recognition result it outputs reference data closest to the input voice data in the voice feature parameter space. According to this, as shown in FIG. 5(a), the algorithms A and B corresponds to "South Carolina" and "North Carolina" as the recognition results, respectively. The recognition results and the vector distances are sent to the judgement section 136.

In this embodiment, the judgement section 136 computes the product of the vector distances (similarity for every reference data, and derives the media conversion result giving priority to the precision based on the value of the product. FIG. 5(b) shows the products of the vector distances shown in FIG. 5(a) and the overall judgement result based on these products. That is, according to FIG. 5(b), the products of the vector distances (similarity) which are obtained by the algorithms A and B with respect to each of the reference data are computed. "North Carolina" indicating the smallest product of the vector distance is outputted as the recognition result from the judgement section 136. As described above, the recognition results obtained by the two algorithms are subjected to the overall judgement, whereby the recognition result giving priority to the precision is derived.

The result derived by the judgement section 136 as described above is sent to the electronic mail transmission section 137 (Step 313), and the electronic mail transmission section 137 inquires the mail server 160 via the Internet 150 for whether a mail address obtained by the judgement section 136 is present (Step 314). When the mail address is present, the electronic mail transmission section 137 forms a header of the electronic mail (Step 308). When no mail address is present, the electronic mail transmission section 137 requests the information sender to input the electronic mail address in the form of voice to the media conversion apparatus 130 again (Step 316).

When the mail address obtained as the result of the voice recognition is present and the header of the electronic mail is formed, a transmission of a message is performed, subsequently.

Figure 4:
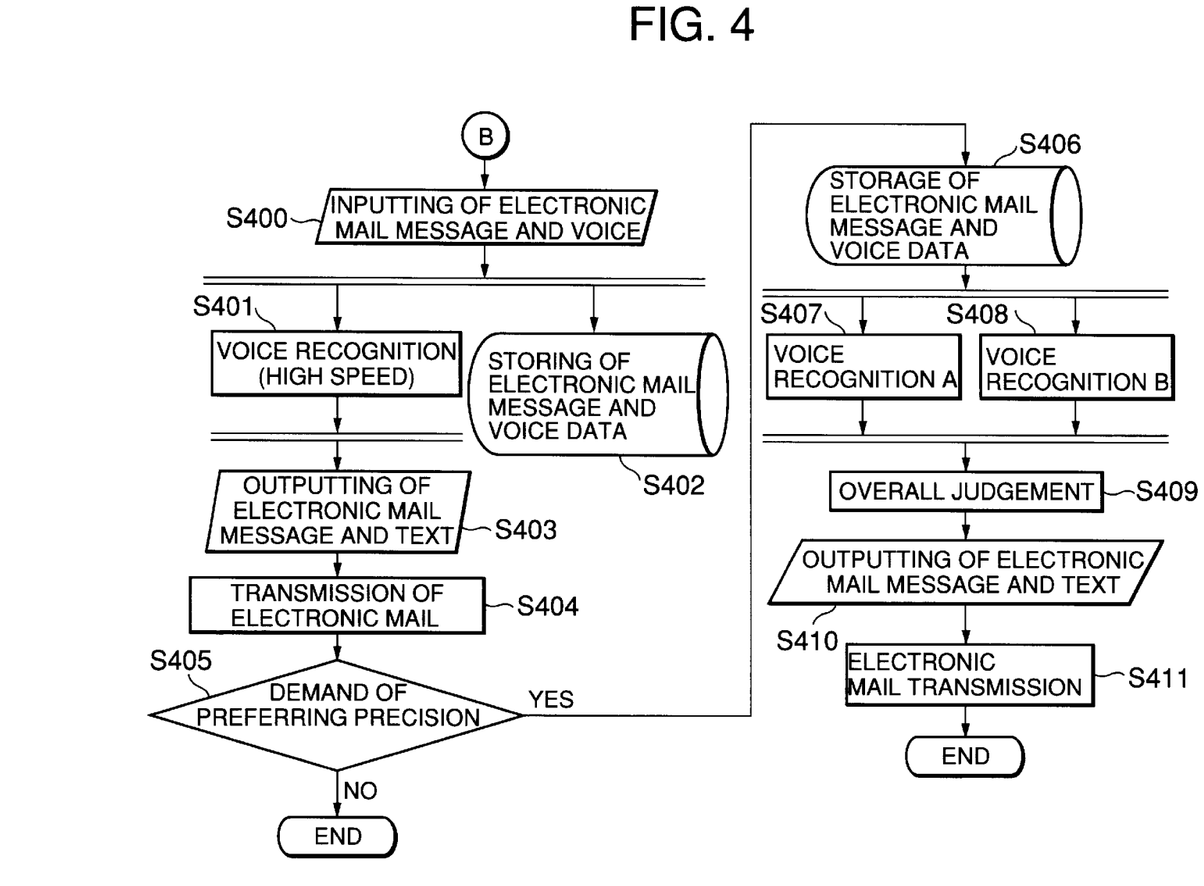
FIG. 4 is a flow chart for explaining an operation of the voice conversion apparatus according to the second embodiment, together with FIG. 3.

The information sender inputs the message in the form of voice via the telephone network 120 (Step 400, see FIG. 4). Its voice data is sent to the voice recognition section 133 from the telephone receiving section 131 and, at the same time, is sent to the voice storage buffer 132 to be stored (Step 402).

The voice recognition section 133 performs a voice recognition for the received message in the form of voice, using a high speed voice recognition algorithm (Step 401). The result of the voice recognition is sent to the electronic mail transmission section 137 (Step 403). The electronic mail transmission section 137 transmits the text data (message) to the mail server 160 via the internet 150 using the electronic mail, the text data being obtained as the result of the voice recognition by the voice recognition section 133 (Step 404).

The information receiver reads the content of the electronic mail. When a meaning of the message is ambiguous because of a recognition error or the information receiver seeks to know a precise content of the message, the information receiver can request the recognition result giving priority to the precision for the electronic mail transmission section 137 (Step 405). When the electronic mail transmission section 137 receives the request for the result giving priority to the precision from the information receiver, the message in the form of voice stored in the voice storage buffer 132 is read out to the two voice recognition sections 134 and 35 (Step 406). The voice recognition sections 134 and 135 perform the voice recognitions according to the voice recognition algorithms A and B giving priority to the precision, respectively (Steps 407 and 408). The results of the voice recognitions are transferred to the judgement section 136. The judgement section 136 makes an overall judgement for these two results as described above, whereby the judgement section 136 derives the text data giving priority to the precision (Step 409). The voice recognition result giving priority to the precision derived by the judgement section 136 is sent to the electronic mail transmission section 137 (Step 410), and is transmitted as an electronic mail, again (Step 411).

Figure 6:
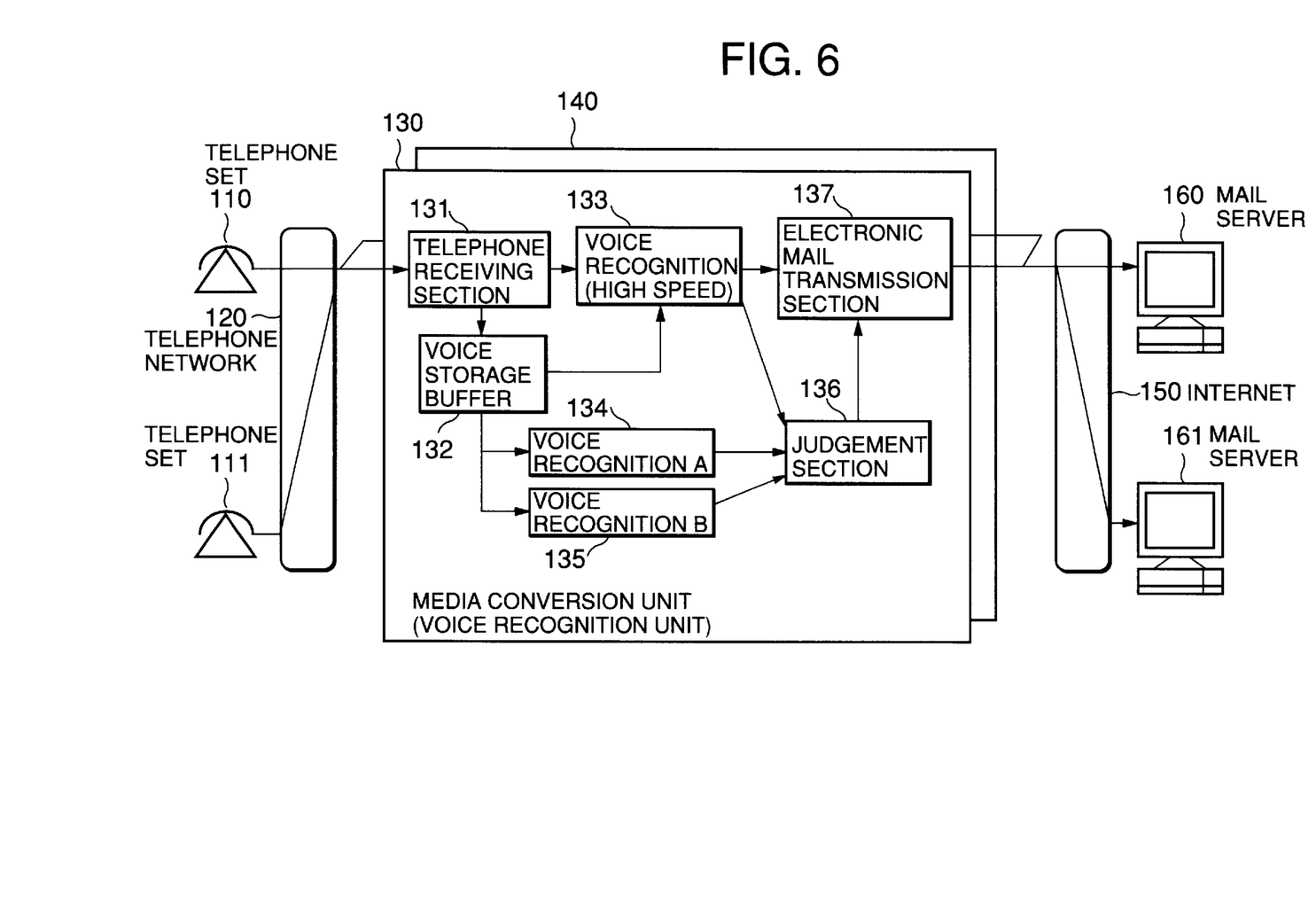
FIG. 6 is a drawing for explaining a structure of multimedia conversion system according to a third embodiment.
Figure 7:
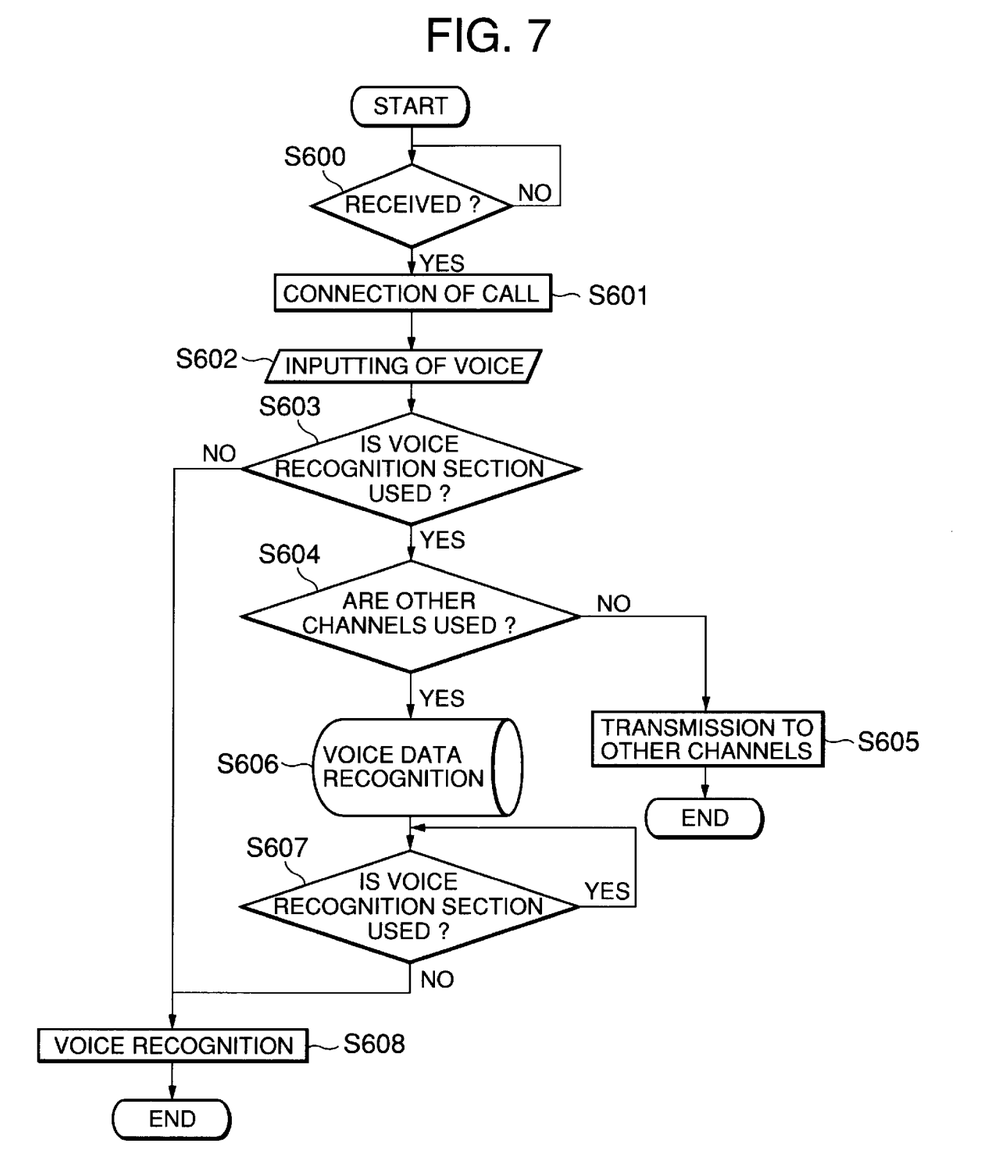
FIG. 7 is a flow chart for explaining an operation of the multimedia conversion system according to the third embodiment.

Next, a third embodiment of the present invention will be described with reference to FIGS. 6 and 7.

The third embodiment concerns a multimedia conversion system composed of the plurality of multimedia conversion apparatuses according to the second embodiment, which is capable of being adapted to a case where a plurality of users compete with each other. To be concrete, as is shown in FIG. 6, the multimedia conversion system of the third embodiment comprises a voice recognition apparatus 140 having the same structure as that of the voice recognition apparatus 130 shown in FIG. 2, and performs a service to convert a voice mail to an electronic mail using two channels.

In such multimedia conversion system, an operation in a case where a plurality of users compete with each other will be described with reference to a flow chart of FIG. 7.

The case will be described, for example, in which when a media conversion communication is being performed between the telephone set 110 and the mail server 160, a media conversion communication is performed between the telephone set 111 and the mail server 161.

When a call is received from the telephone set 111 via the telephone network 120 while the media conversion communication is being performed between the telephone set 110 and the mail server 160 (Step 600), the call is received by the telephone receiving section 131 (Step 601 Subsequently, either a mail address or a message in the form of voice is inputted form the telephone set 111 (Step 602), the telephone receiving section 131 confirms whether the voice recognition section 133 is being occupied (Step 603). If the voice recognition section 133 is not being occupied, a voice recognition is performed in the voice recognition section 133 according to the normal procedure Step 608

On the contrary, in a case where the voice recognition section 133 is being occupied between the telephone set 110 and the mail server 160, the telephone receiving section 131 checks whether the voice recognition apparatus 140 of the different channel is being occupied. When the voice recognition apparatus 140 of the different channel is not being occupied, the voice data form the telephone set 111 is transferred to the voice recognition apparatus 140 (Step 605).

When the voice recognition apparatus 140 is being also occupied, the voice data from the telephone set 111 is stored in the voice storage buffer 132 (Step 606), and after completion of the voice recognition between the telephone set 110 and the mail server 160 (Step 607), the voice recognition section 133 receives the voice data supplied from the telephone set 111 from the voice storage buffer 132 so as to perform the voice recognition for the voice data therein (Step 608).

As described above, the multimedia conversion system according to the third embodiment of the present invention can be used when the media conversion communications from the plurality of users compete with each other.

The function to confirm whether the voice recognition section 133 and other voice recognition section 140 are being occupied is not illustrated in the drawings, and the function of the telephone receiving section 131 to transfer the data to other channels is not illustrated in the drawings. However, the functions can be realized, by a person skilled in the art, by providing a microprocessor unit (MPU) having a memory storing a communication program, a CPU for performing a control operation according to this program and an interface circuit.

In the above-described embodiments, the signal processing sections 33, 34 and 35 including the media conversion algorithms and the voice recognition sections 133, 134 and 135 can be constructed by a program for realizing a algorithm and a general purpose computer. However, they may be constituted by special purpose hardware.

Also the functions of the judgement sections 36 and 136 for performing the overall judgement for the plurality of media conversion results to derive the media conversion result giving priority to the precision may be realized by any of a software and a special purpose hardware.

Moreover, in the above-described embodiments, the media conversion from the voice mail (voice data) to the electronic mail (text data) by means of the voice recognition was mentioned as the example of the multimedia conversion. However, as a matter of course, a speech synthesis and a character recognition are also mentioned as the media conversion.

The multimedia conversion apparatus of the present invention will be possible to offer the media conversion result with a quality desired especially by the user, by performing both of the media conversions giving priority to the processing time and to the precision.

Particularly, as the data to be received can be specified by the instruction of the user, the voice recognition result whichever giving priority to the processing time and giving priority to the precision can be selected in accordance with user's will depending on more important factor for the user.

Moreover, the judgement section derives the media conversion result with a high precision, based on the plurality of media conversion results obtained from the signal processing sections giving priority to the precision, and the judgement section selects the media conversion result of the signal processing section including the algorithm suitable for the state of the received data. Therefore, it is prevented that only the feature of the specific algorithm is reflected and the precision of the media conversion result is degraded, and the media conversion without depending on the characteristics of the specific algorithm can be performed for various kinds of the input data.

Moreover, when the media conversion apparatus is being occupied by other users, the data can be received either by storing the data temporarily in the buffer or by transferring the data to other channels in which resources are not occupied. Therefore, one multimedia conversion apparatus or one multimedia conversion system can be used by the plurality of users, so that the user, especially, the receiving side user, is not required to wait until the resource is released or the sender is not required to send the data again.

Although the present invention has been fully described by way of the preferred embodiments thereof with reference to the accompanying drawings, various changes and modifications will be apparent to those having skill in this field. Therefore, unless these changes and modifications otherwise depart from the scope of the present invention, they should be construed as included therein.

What is claimed is:

1. A multimedia conversion apparatus performing an information format conversion into different media, the multimedia conversion apparatus comprising;
   a receiving section for receiving data from a plurality of users via an incoming communication line;
   a plurality of signal processing sections for performing a media conversion for said data to convert said data into different information formats with different qualities according to different algorithms; and
   a transmission section for partially selecting a plurality of media conversion results obtained by the signal processing sections to transmit the selected media conversion result via an outgoing communication line.

2. The multimedia conversion apparatus according to claim 1, wherein said transmission section receives an instruction indicating a quality requirement of the media conversion result from a receiving side user connected to the other end of the outgoing communication line, and selects a media conversion result with a proper quality based on said instruction to transmit the selected media conversion result to the receiving side user.

3. The multimedia conversion apparatus according to claim 1 wherein said transmission section selects a media conversion result giving a priority to a processing time expected by a receiving side user connected to the other end of the outgoing communication line among said plurality of media conversion results and transmits the selected media conversion result to the receiving side user.

4. The multimedia conversion apparatus according to claim 1, wherein said transmission section selects a media conversion result giving a priority to a precision expected by a receiving side user connected to the other end of the outgoing communication line among said plurality of media conversion results and transmits the selected media conversion result to the receiving side user.

5. A multimedia conversion apparatus performing an information format conversion into different media, the multimedia conversion apparatus comprising;
   a receiving section for receiving data from a plurality of users via an incoming communication line;
   a plurality of signal processing sections for performing a media conversion for said data to convert said data into different information formats with different qualities according to different algorithms;
   a judgement section for judging each quality of media conversion results obtained by the signal processing sections, and deriving a media conversion result with the highest quality; and
   a transmission section for selecting said media conversion result derived in said judgement section and transmitting said selected media conversion result to a receiving side user via an outgoing communication line.

6. A multimedia conversion apparatus performing an information format conversion into different media, the multimedia conversion apparatus comprising;
   a receiving section for receiving data from a plurality of users via an incoming communication line;
   a processing time priority signal processing section for performing a media conversion for said data received by said receiving section to convert said data into a different information format on real time;
   a plurality of precision priority signal processing sections each for performing a media conversion giving priority to a precision for said data to convert said data into different information formats according to different algorithm respectively;
   a judgement section for judging each quality of media conversion results obtained by said precision priority signal processing sections, and deriving a media conversion result with the highest quality; and
   a transmission section for transmitting a media conversion result obtained from said processing time priority signal processing section first to said receiving side user, and transmits the media conversion result with the highest quality derived by said judgement section to said receiving side user, based on an instruction of said receiving side user requesting a media conversion result giving a priority to a precision rather than a processing time.

7. The multimedia conversion apparatus according to claim 5, wherein said judgement section refers to the data received by said receiving section and selects a media conversion result of a signal processing section including an algorithm suitable for said received data among said plurality of media conversion results.

8. The multimedia conversion apparatus according to claim 6, said multimedia conversion apparatus further comprising:

- a buffer for temporarily storing data received in said receiving section from at least one user when said multimedia conversion apparatus being used by other user, and having said data read out for performing media conversion for said at least one user when media conversion for said other user having been completed.

9. A multimedia conversion system provided in a communication network accommodating a plurality of users comprising;

- a plurality of multimedia conversion apparatus for performing an information format conversion into different media, and each multimedia conversion apparatus comprising a control circuit for transferring data from at least one user, when the multimedia conversion apparatus being used by other user, to one of other multimedia conversion apparatus of said multimedia conversion system.

* * * * *